April 2, 1968
R. FREEMAN
3,376,499
SIGNAL PROCESSING APPARATUS FOR FACILITATING
THE DISPLAY OF FINE STRUCTURE IN
GYROMAGNETIC RESONANCE SIGNALS
Filed Jan. 27, 1965
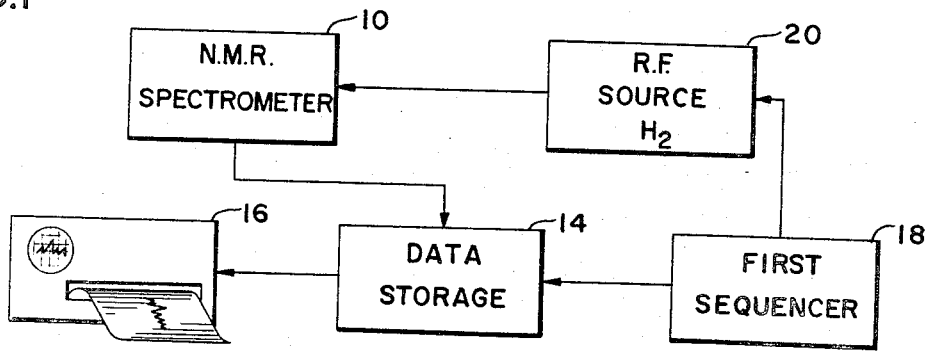
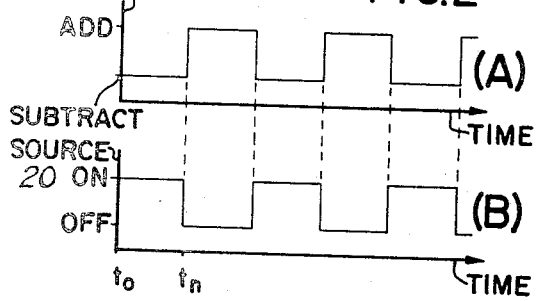
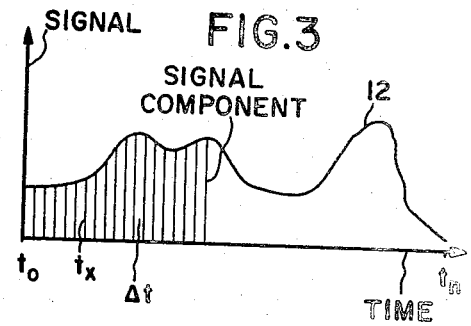
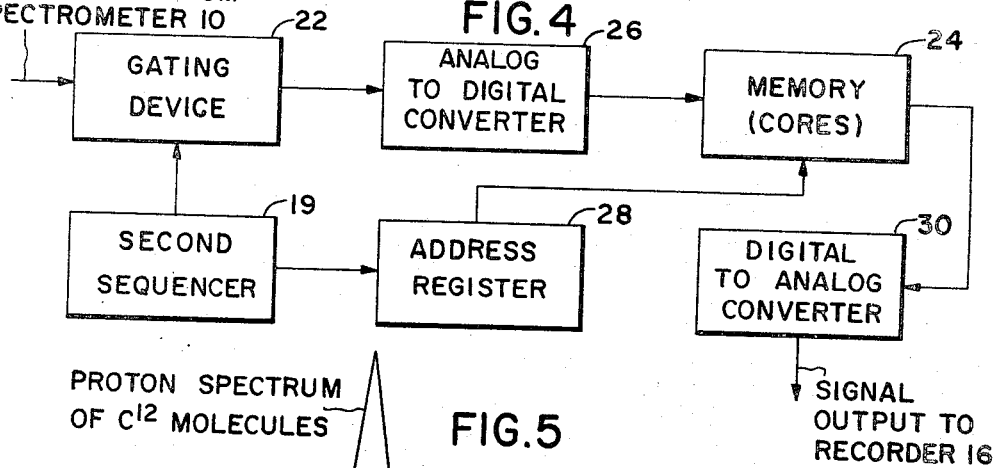
INVENTOR.
RAYMOND FREEMAN
BY
ATTORNEY

# United States Patent Office 3,376,499
Patented Apr. 2, 1968

3,376,499
SIGNAL PROCESSING APPARATUS FOR FACILITATING THE DISPLAY OF FINE STRUCTURE IN GYROMAGNETIC RESONANCE SIGNALS
Raymond Freeman, Menlo Park, Calif., assignor to Varian Associates, Palo Alto, Calif., a corporation of California
Filed Jan. 27, 1965, Ser. No. 428,413
5 Claims. (Cl. 324—.5)

ABSTRACT OF THE DISCLOSURE

A gyromagnetic apparatus is disclosed for obtaining the resonance spectrum of an isotope normally obscured by other molecules having stronger resonance characteristics. During a first sweep of the resonance spectrum the resonance signal is time divided, converted to a digital values and stored in a data storage device. During a second sweep of the resonance spectrum the sample is irradiated by an additional radio frequency field $H_2$ and the resulting spectrum converted to digital form is added with reverse polarity to the previously stored signal such that the second signal is effectively subtracted from the first during each subsequent sweep repetition whereby the net signal stored is representative of the resonance spectrum of the obscured isotope.

---

This invention relates to a novel method and means for processing signal information, and in particular, to a method and system for analyzing data obtained from resonance radiation.

This invention is particularly applicable to resonance spectroscopies with a coherent radiation source, such as nuclear magnetic resonance (NMR), electron spin resonance, quadrupole resonance, ultrasonic resonance and optical laser spectroscopy, inter alia. However, the invention will be described with reference to NMR spectroscopy for the purpose of explanation.

NMR spectroscopy is based on a method of detecting the magnetic particles of the nuclei of a sample material subjected to the forces of an external polarizing magnetic field and an alternating magnetic field. The detected magnetic changes of the nuclei are represented as NMR spectra on a graphic recorder or oscilloscope, for example. Changes in the magnetic moment of the nucleus as it precesses around its magnetic axis establish the resonant frequency of the isotope, and thereby provide a manner of positive identification.

NMR spectra often contain interesting fine structure, which may arise from the presence of small amounts of isotopically substituted molecules. For example, naturally occurring organic compounds embody a substantial proportion of carbon 12 nuclei and a very small percentage (about 1%) of the rare isotope carbon 13. Often it would be desirable to observe spectroscopic features that arise from the presence of carbon 13 without interference from the dominant carbon 12 molecules. In many types of spectroscopy, a change of isotope (such as from carbon 12 to carbon 13) produces only very slight changes in the spectrum, making it difficult to detect the features due to the rare isotope if they are obscured by overlying features from the abundant isotope.

Difficulties in the interpretation of all of the structure of NMR spectra arise as a result of the crowding of spectral lines into a small region of the spectrum portion of interest, and to some degree, also from a poor signal-to-noise ratio, among other things. It would be desirable to reveal the normally obscured fine structure in a magnetic resonance spectrum that arises from molecules containing a rare isotope.

Furthermore, known spectrometer systems employ a sweep or modulation across resonance, and such a step is generally followed by synchronous detection to separate "real" from "spurious" signals. But the imposed modulation introduces undesirable effects, such as modulation sideband responses that may be observed in nuclear magnetic resonance. The modulation sidebands present no problem if the modulation is at a very low frequency; that is, less than the resonance line width (expressed in frequency). If the response of the system to a given source is inherently slow, then modulation, if applied, must necessarily be at a low frequency. However, in practice, it is very difficult to build a conventional synchronous detector that is stable at such low frequencies.

An object of this invention is to provide a novel and improved signal processing system.

Another object of this invention is to provide a novel and improved means for storing and analyzing a signal waveform, such as an NMR spectrum.

Another object is to provide a magnetic resonance spectrometer with a stable detection means and which affords an improved signal-to-noise ratio.

A further object is to provide a means for discriminating between features of a spectrum that arise from the presence of different isotopic species, particularly if the species of interest is in low abundance.

According to the invention, a spectrometer having a sample to be analyzed which is excited by a radio frequency, provides an output resonance signal repetitively for a multiplicity of equal time intervals or periods to a data storage circuit, for subsequent readout and recording of a spectrum. The resonance signal is inverted in polarity every alternate interval, such that the output signal applied to the storage circuit is alternately added and subtracted from the stored signal. After an even number of intervals, the total stored signal would be substantially zero.

However, in accordance with this invention, the sample to be analyzed is irradiated by a second strong radio frequency, which is pulsed ON only in coincidence with alternate intervals, which may be the SUBTRACT period, for example. As a result, a spectrum is derived representing the shifted fine line structure attributable to the presence of a rare isotope, that is spin coupled to the nuclei which are generating the recorded spectrum.

The recorded spectrum is enhanced by storing the detected resonance signal in a time averaging computer prior to readout and display. The computer comprises a multiplicity of channels or addresses, such as a matrix of magnetic cores, that serve to store discrete components of the spectrum for every scan across resonance. Each channel or address receives a component of each resonance signal, each component being fed to a given address having the same time reference with respect to the beginning of any scan. The signal components of the fine line spectrum attributable to the presence of a rare isotope are fed into the storage device with every scan whereby the amplitude of the stored signal is greatly increased thereby improving the spectrum.

The invention will be described in greater detail with reference to the drawing in which:

FIG. 1, is a simplified block diagram of an embodiment of the invention;

FIGS. 2A and B, are time plots which will aid in the explanation of the invention;

FIG. 3, is a representation of a breakdown of a spectrum into consecutive channels for the purpose of storing amplitude information;

FIG. 4, is a block diagram of a data storage circuit, such as depicted in FIG. 1; and FIGS. 5A and B, illustrate representative spectra obtained with the inventive system.

Similar numerals refer to similar elements throughout the drawing.

In FIG. 1, an NMR spectrometer 10 comprises a sample to be analyzed disposed in a polarizing field $H_0$, and excited at a resonant frequency by a radio frequency magnetic field $H_1$, as is well known in the art. Other circuitry, such as field-frequency control for example, may be included in the block 10 representing the spectrometer. The spectrometer 10 provides a readout signal or spectrum 12 (see FIG. 3) to a data storage system 14, which will be described further with reference to FIG. 4. In turn, the stored signal is read out and registered on an oscilloscope and recorder 16 in a known manner.

The data storage system includes a gating or switching means, such as a bistable multivibrator or flip-flop, that responds to a sequencer 19 (shown in FIG. 4) whereby the analog input signal is averaged over an interval $\Delta t$, being the width of one channel, for later conversion to binary form for storage in one address of the memory. Typically, $\Delta t$ might be ⅛-second.

Another sequencer 18, designated as the "First Sequencer," controls a gating or switching means whereby the polarity of the signal being stored is reversed cyclically with successive positive and negative intervals of substantially the same duration. This periodic inversion may be achieved either outside the data storage system, or inside by means of a periodic change in the binary logic in the circuitry that feeds the memory. As shown in FIG. 2, this switching is in synchronism with the switching of the RF source. It may correspond to two complete sweeps through the whole spectrum, one in an "Add" mode and the other in a "Subtract" mode, or to a repetition of such pairs of sweeps. Alternatively, each channel of the spectrum may be subdivided into equal "Add" and "Subtract" intervals, in which case the two sequencers 18 and 19 would be operating at frequencies in the ratio 2:1 and in synchronism, and might therefore, form part of one master timing unit. Other relationships between the two sequencer frequencies might prove to be convenient.

The gross features of the spectrum remain the same for the "Add" and "Subtract" intervals and therefore cancel one another and produce zero output signal, indicated by a horizontal or DC line on the recorder 16. The fine features of the spectrum; for example, the features attributable to the presence of a small proportion of a rare isotope, would be modified by irradiation with the radio frequency supplied by source 20 during one of the intervals, e.g., the "Subtract" interval but not during the other vals, e.g., the "Add" interval, and hence the added and subtracted signals will not totally cancel at the output but will produce a net resonance signal representative of the normally obscured isotope in the sample. The nature of the modification might be a change in intensity or line width or a shift in frequency.

In accordance with one aspect of this invention a means is provided for modifying some features of the spectrum while the rest of the spectrum remains unchanged, and this is accomplished through the influence of the source 20. In its general sense, this might be any physical influence that affects the form of the spectrum; for example, temperature, pressure, electromagnetic radiation of all kinds. But it will be illustrated here by means of an example where the source is a second radio frequency field applied near to resonance for the rare isotope of interest. This RF field $H_2$ may be of strength in the order of 5 milligauss, for example, as compared with about 0.1 milligauss for the RF field of the spectrometer $H_1$. It may be set off-resonance from the carbon 13 lines causing a small displacement of the coupled proton lines as shown in FIG. 5; or it may be set at the mean resonant frequency of the carbon 13 lines, causing the coupled proton lines to coalesce to a single line, an experiment known as "spin decoupling"; or it might be set on the center of a single carbon 13 transition and made sufficiently weak so that the only effect is to split the coupled proton lines; or in suitable molecules it may be set so as to change energy level populations through the process known as the "general Overhauser effect" thus influencing the intensity of the coupled proton lines.

The radio frequency $H_2$, which might typically be at 15 mc./s., is pulsed on and off for substantially equal intervals in synchronism with the inversion of the signal in the data storage device, at a low frequency which might be 0.1 cycle per second by way of example. In practice, the presence of $H_2$ in the radio frequency probe of the NMR spectrometer may give rise to heating effects which would tend to cycle at the frequency at which $H_2$ is switched on and off. It may then be preferable to move the frequency of the RF field $H_2$ far away from resonance where its effect on the carbon 13 nuclei and the coupled proton nuclei is negligible, rather than switch it off altogether, for then the heating effect would be continuous and not cycle with the frequency of the sequencer 18. Thus, source "off" in FIG. 2, would indicate "source ineffective."

Normally, the proton magnetic resonance spectrum consists of the sum of spectra from molecules that contain carbon 13 (about 1% of the total) and molecules that contain carbon 12 ($C^{12}$) nuclei. The $C^{12}$ element produces a relatively large proton signal (see FIG. 5A), and virtually obscures the weak $C^{13}$ satellite spectrum of interest. But as a result of the ADD and SUBTRACT process and the pulsing ON and OFF of the $H_2$ field, the actual spectrum recorded by the recorder 16 does not contain the proton signal of $C^{12}$ substituted molecules, but presents a clear proton spectrum (FIG. 5B), of the $C^{13}$ molecules only.

In accordance with another aspect of this invention, the data storage system 14 comprises a series of magnetic cores, making up a finite number of separate storage addresses or channels (400 by way of example) which are controlled by the sequencer 19 that activates each address successively and in a predetermined order during each complete scan across resonance.

Each spectral signal is sampled at equally spaced intervals, and the sampled data is stored as discrete bits of information in respective cores, which serve to make up separate addresses or channels of a time averaging computer. By way of example, with a 400 address system and 50 seconds for a complete scan through the spectrum, each address samples a portion of the spectrum spaced ⅛-second apart in time. Other storage systems, such as a magnetic tape apparatus, may be employed in lieu of the cores.

Each channel or address is coded to receive that portion or component of a resonance spectrum that bears the same time reference $t_x$, and all signal components fed to any one channel or address are ADDED and SUBTRACTED successively. Therefore, the amplitude of the stored signal at any memory channel or address is changed in alternate steps positively and negatively by an amount corresponding to the amplitude of the resonance signal at any given instant $t_x$ related to such channel or address. In this manner, the useful information signal that is of interest is substantially strengthened while random noise is effectively attenuated.

FIG. 4 depicts a data storage system, such as may be employed for the inventive system of FIG. 1. The signal from the spectrometer 10 is directed to a gating device 22, which may be a bistable multivibrator or flip-flop, that is triggered by the clock or sequencer 19 to break down the spectrum into a series of channels and to feed the average value of the signal in any given channel into a memory 24. The resonance signal with either polarity is processed by an analog-to-digital converter 26, which provides the signal as digital information to the memory 24. Simultaneously, the sequencer 19 actuates an address register 28 that serially energizes the channels or addresses of the memory 24 in a predetermined sequence to accept and store digital information or resonance components being received from the converter 26. The stored signal may be read out by means of a digital-to-analog converter 30 coupled to the memory 24, whereby an analog signal or waveform is supplied to the oscilloscope and recorder 16 for display.

There has been described herein an inventive apparatus wherein a difference spectrum is obtained by using a like number of ADD and SUBTRACT periods. The spectrum or waveform may be derived from various sources, such as optical, gyromagnetic or electromagnetic radiation, which are capable of producing spectra that may be modified by an energy source. Thus, it is possible to separate the desirable portions of a nuclear magnetic resonance spectrum, for example, from other overlapping portions. Also, a method of modulating a source and for synchronously detecting the effect of such modulation on a system is provided, even when the response of the system to the modulated source is very slow (i.e., where the time constant is in the order of one second or longer).

The modulation process does not introduce complicating factors into the spectrum, such as modulation sideband responses that are usually observed when the modulation frequency is larger than the resonance line widths.

It should be noted that the inventive concept is not limited to the particular configuration, parameters and values set forth above. For example, the spectrometer may be an electron paramagnetic resonance spectrometer, and the frequencies and the time values described may be varied within the scope of the invention.

What is claimed is:

1. Apparatus for obtaining and processing a gyromagnetic resonance signal representative of a particular element in an analytical sample comprising means for providing a resonance signal spectrum repetitively over an even number of periods, means for storing said resonance signals, means for adding the resonance signals to said storage means during alternate periods and means for exerting an additional physical influence on said sample for modifying a spectral component of the spectrum while the rest of the spectrum remains unchanged and for subtracting the resulting resonance signals from said stored signals during the remaining periods.

2. Apparatus as recited in claim 1 wherein the means for providing the resonance signal comprises a spectrometer having a first exciting frequency for continually exciting said sample and a relatively strong second frequency for exciting said sample and exerting said influence during said remaining periods.

3. Apparatus according to claim 2 wherein said apparatus includes a sequencer for initiating said periods and for applying said second frequency only during said remaining periods.

4. Apparatus as recited in claim 1 further including means for dividing said signals into a plurality of identical adjacent information channels, means for digitizing the signal values in each channel to produce a set of digital values representing said signals, and means for applying the digital information to a multichannel recorder, alternate sets of digital information being added into the recorder and the remaining sets being subtracted.

5. Apparatus as recited in claim 4 further including sequencer means for initiating each of said periods and for simultaneously applying said additional physical influence to said sample only during said remaining periods.

References Cited

UNITED STATES PATENTS

| | | | |
|---|---|---|---|
| 2,987,701 | 6/1961 | Grannemann | 340—15.5 |
| 3,112,397 | 11/1963 | Crook | 340—15.5 |
| 3,275,980 | 9/1966 | Foster | 340—15.5 |
| 3,297,860 | 1/1967 | Weiss | 324—0.5 |

OTHER REFERENCES

"Paramagnetic Resonance," Proceeding of the First International Conference Held In Jerusalem, July 16–20, 1962, edited by E. M. Low, vol. 2, 1963, pp. 698–703.

RUDOLPH V. ROLINEC, *Primary Examiner.*

M. J. LYNCH, *Assistant Examiner.*